United States Patent
Naiga et al.

(10) Patent No.: US 10,447,851 B2
(45) Date of Patent: Oct. 15, 2019

(54) INSTANT AND COHESIVE USER ACCESS TO DIVERSE WEB SERVICES

(71) Applicant: Verizon Patent and Licensing Inc., Arlington, VA (US)

(72) Inventors: Kiran Naiga, Mountain View, CA (US); Gilda Majidi, San Jose, CA (US); Momin Mirza, Santa Clara, CA (US); Gaurav Gupta, Fremont, CA (US); Avinash S. Chugh, Nashua, NH (US); Manian Krishnamoorthy, Hyannis, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 507 days.

(21) Appl. No.: 14/867,960

(22) Filed: Sep. 28, 2015

(65) Prior Publication Data
US 2017/0094057 A1   Mar. 30, 2017

(51) Int. Cl.
| H04M 1/64 | (2006.01) |
| H04M 3/493 | (2006.01) |
| G06F 3/0482 | (2013.01) |
| G06F 3/0484 | (2013.01) |
| H04L 29/08 | (2006.01) |

(52) U.S. Cl.
CPC .......... *H04M 3/493* (2013.01); *G06F 3/0482* (2013.01); *G06F 3/04842* (2013.01); *H04L 67/02* (2013.01); *H04L 67/34* (2013.01)

(58) Field of Classification Search
CPC .................................................... H04M 3/493
See application file for complete search history.

(56) References Cited

U.S. PATENT DOCUMENTS

| 6,282,515 | B1 | 8/2001 | Speicher | |
| 9,420,103 | B1 | 8/2016 | Varman et al. | |
| 9,767,473 | B2 | 9/2017 | Dube et al. | |
| 2002/0013728 | A1* | 1/2002 | Wilkman | G06Q 30/02 |
| | | | | 705/14.53 |
| 2004/0177376 | A1* | 9/2004 | Caspi | H04N 7/18 |
| | | | | 725/81 |
| 2005/0203835 | A1* | 9/2005 | Nhaissi | G06Q 20/10 |
| | | | | 705/39 |
| 2008/0262911 | A1 | 10/2008 | Altberg et al. | |
| 2009/0061764 | A1 | 3/2009 | Lockhart et al. | |
| 2010/0173618 | A1* | 7/2010 | Kass | H04M 3/42221 |
| | | | | 455/414.1 |

(Continued)

*Primary Examiner* — Joseph T Phan

(57) ABSTRACT

Techniques described herein may be used to enable a user to obtain services from multiple organizations in a seamless, automated, and efficient manner. A network device may cause a user device to automatically access a web service by, for example, downloading a mobile application or accessing a web page designed to provide the web service. The network device may automatically identify a second web service that is logically related to the first web service and offer the second web service to the user. If the user accepts the second web service, the network device may cause the user device to automatically access the second web service via a mobile application, a webpage, etc. Identification and authentication issues for accessing the first or second web services may be automatically resolved by network device based on the mobile device number (MDN) of the user device and/or other profile information.

20 Claims, 9 Drawing Sheets

(56) References Cited

U.S. PATENT DOCUMENTS

| | | |
|---|---|---|
| 2011/0251892 A1 | 10/2011 | Laracey |
| 2012/0130822 A1 | 5/2012 | Patwa et al. |
| 2012/0281820 A1 | 11/2012 | Hamerschlag et al. |
| 2016/0192108 A1* | 6/2016 | Chaudhary ........... H04W 4/003 455/411 |

* cited by examiner

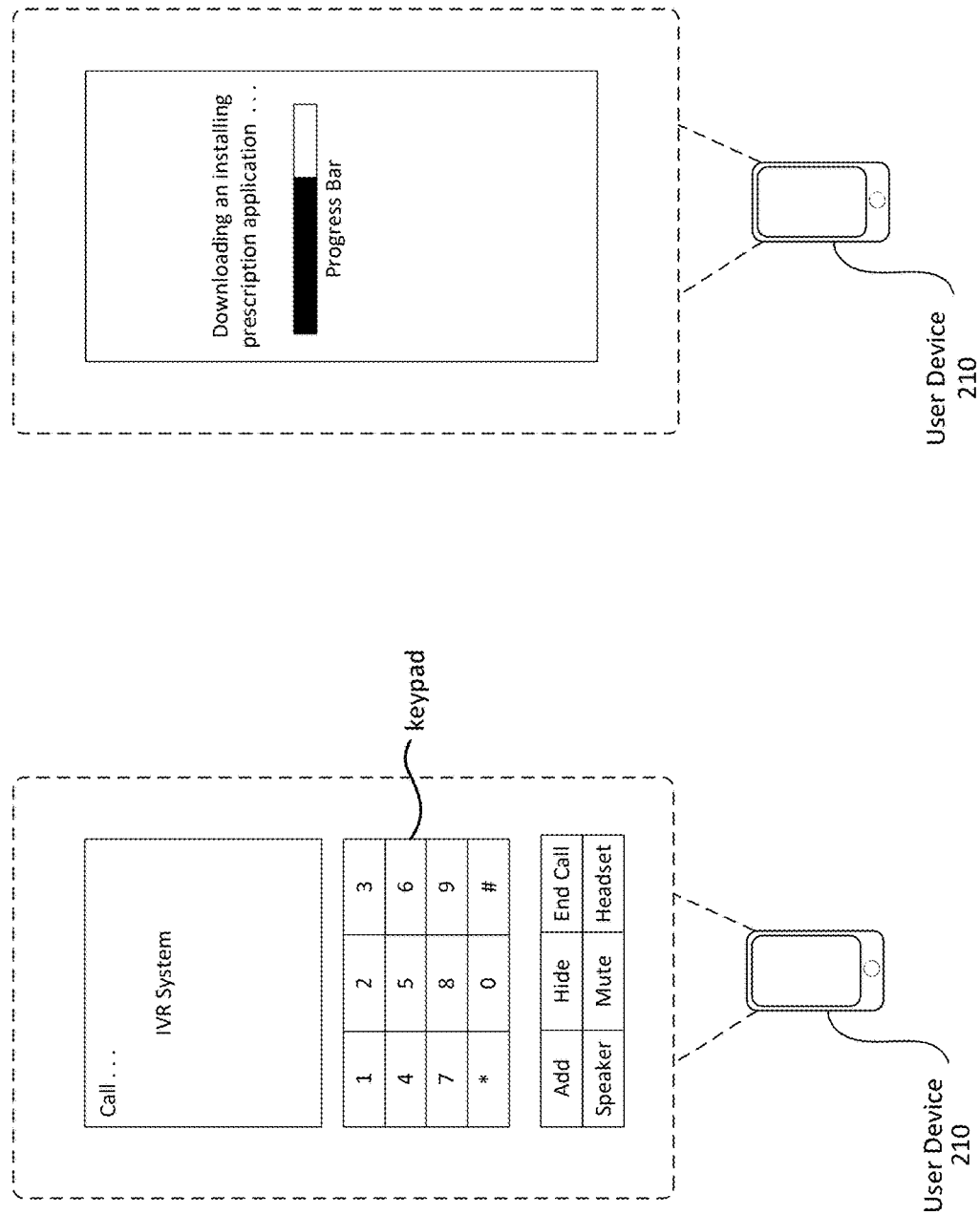

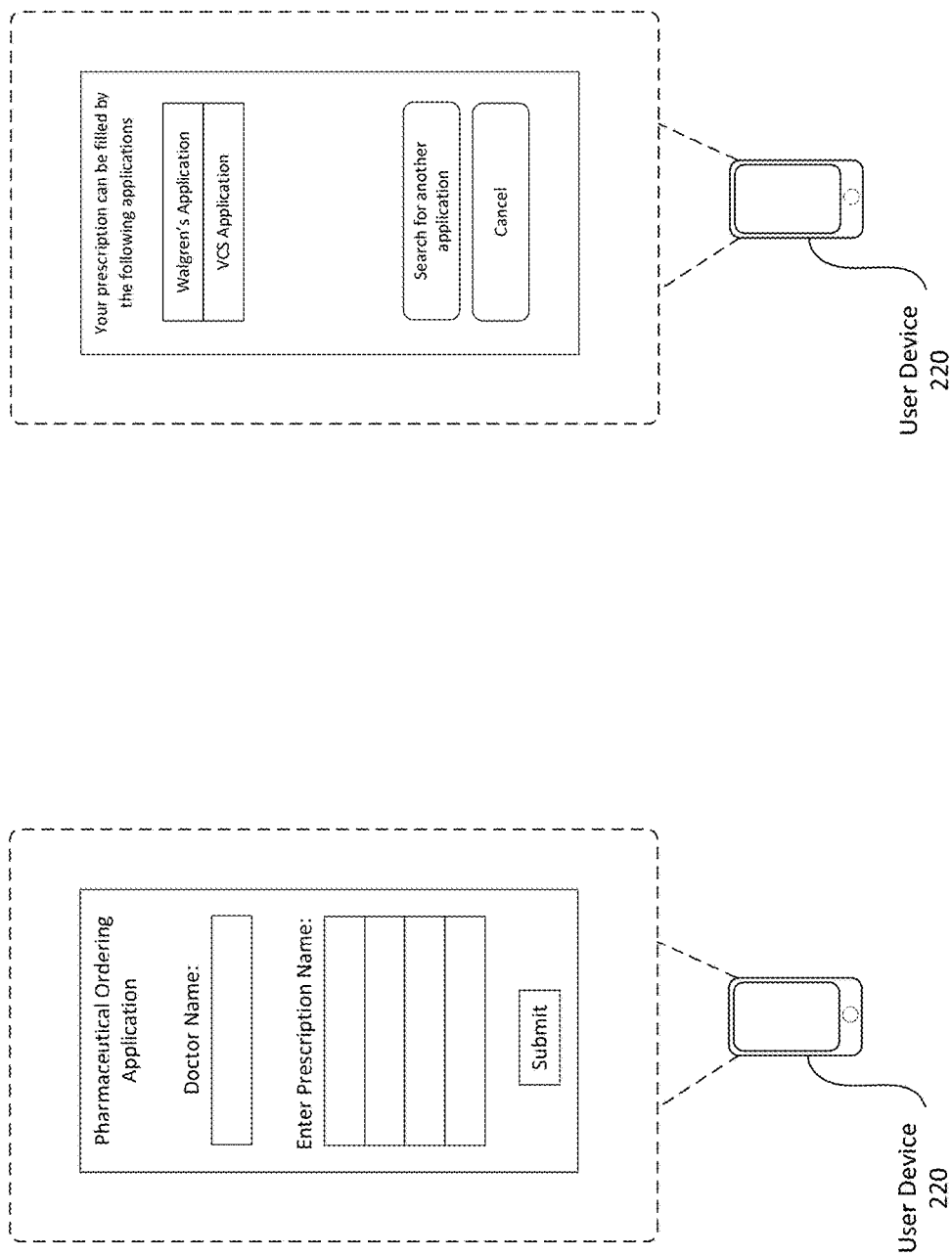

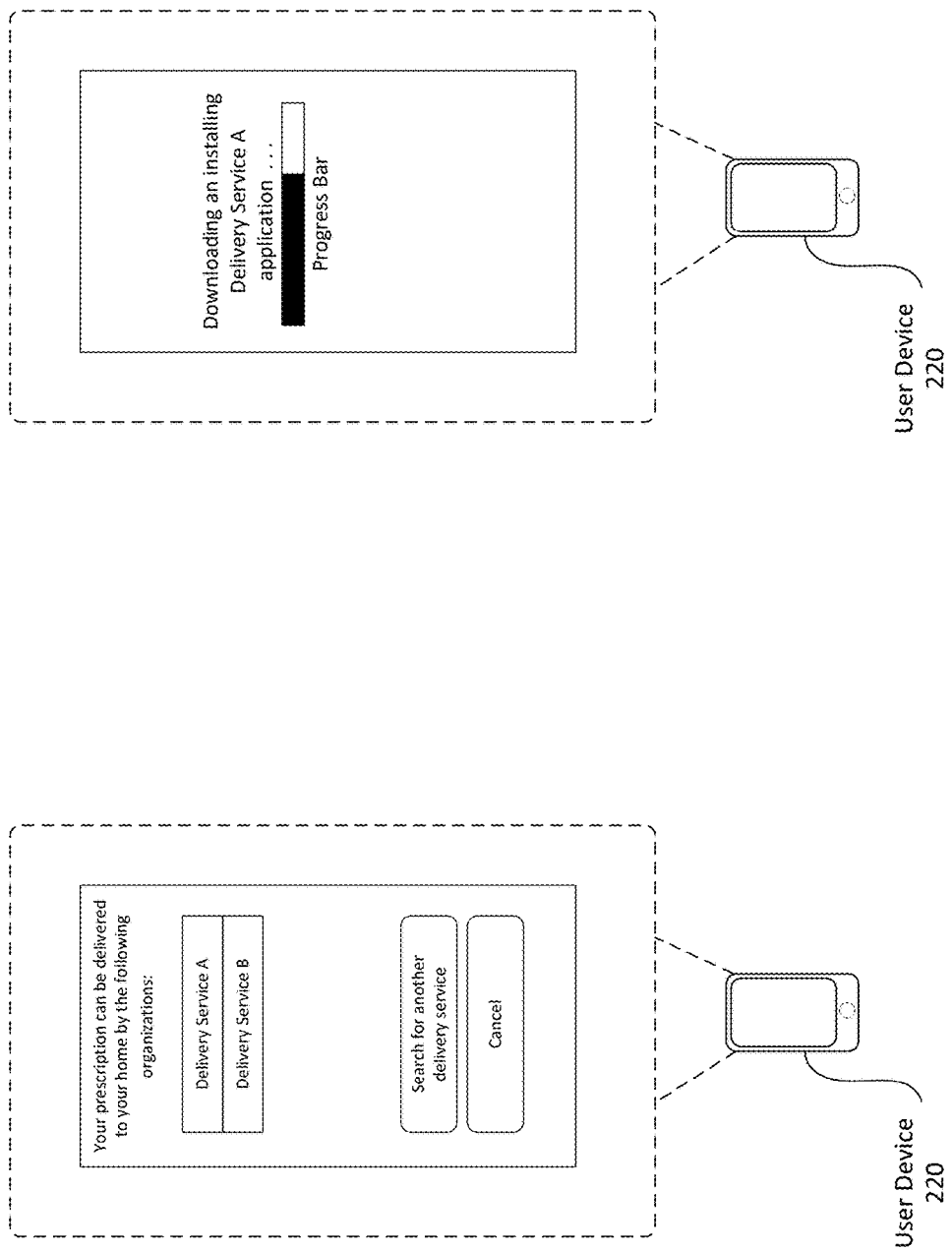

INSTANT AND COHESIVE USER ACCESS TO DIVERSE WEB SERVICES

BACKGROUND

Smartphones, tablet computers, and other types of user devices are capable of providing a user with access to a variety of web services. For instance, a smartphone may enable a user to call an interactive voice response (IVR) system for information, contact a call center for technical support, download and install mobile applications, make online purchases, etc.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

FIGS. 4-13 are examples of user interfaces, according to implementations described herein.

DETAILED DESCRIPTION OF THE PREFERRED EMBODIMENTS

Figure 1:
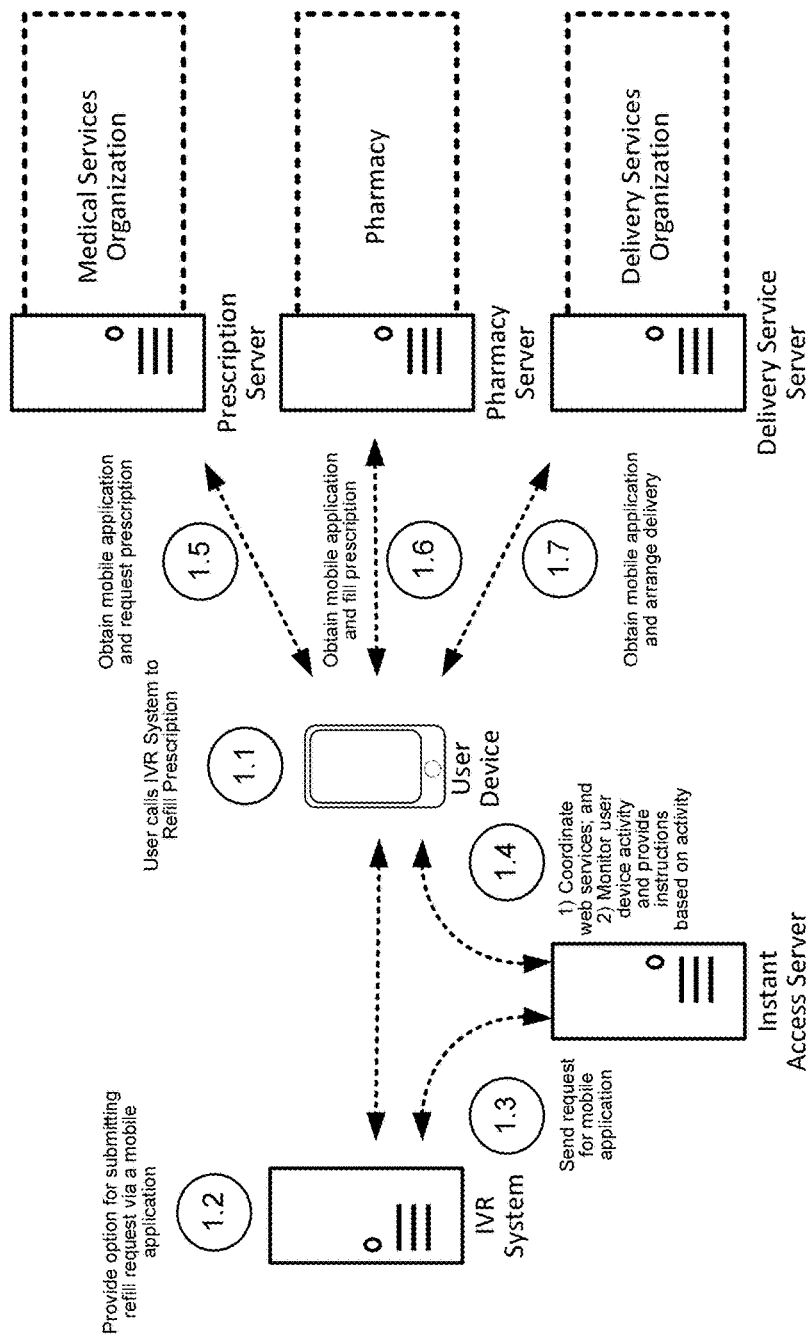
FIG. 1 is an example overview of an implementation described herein.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

Currently available networking technologies enable a user to access web services via a user device. However, currently available solutions for providing users with web services include certain limitations. For example, if a user would like obtain and fill a prescription for medication, the user may call an IVR system of a medical services organization (e.g., a hospital, a doctor's office, etc.) in order to obtain a prescription for the medication. After obtaining the prescription, the user may then need to take or send the prescription to a pharmacy in order to have the prescription filled. Finally, the user may need to drive to the pharmacy in order pick up the prescription or contact a delivery services company to arrange for the prescription to be delivered at the home of the user. As such, the user may contact several organizations in order to access a series of services that are all related to the objective of obtaining prescription medication.

Techniques described herein may be used to enable a user to obtain services from multiple organizations in a seamless, automated, and efficient manner. A network device (e.g., a server) may be notified of a web service (e.g., an online banking service, a prescription medication ordering service, etc.) requested by a user. The network device may cause the user device to automatically access the web service by, for example, downloading a mobile application, or accessing a web page, designed to provide the web service to the user. The network device may monitor the user device, with respect to using the web service, and maintain a context for the user device. The context may include information regarding the web service that the user device has accessed, inputs and outputs from the user device regarding the web service, etc., in order to maintain a clear picture of what the user device is doing and whether the user device has successfully accessed the web service.

Based on the context, the network device may automatically identify a second web service that is logically related to the first web service and may offer the second web service to the user. For instance, if the first web service enabled the user device to deposit checks into a checking account, the network device may identify a web service that would allow the user to make a credit card payment, put money into a retirement account, etc. If the user accepts the second web service, the network device may cause the user device to automatically access the second web service via a mobile application, a webpage, etc. Identification and authentication issues for accessing the first and/or second web service may be automatically resolved by the network device based on the mobile device number (MDN) of the user device and/or other profile information accessible to the network device. As such, the network device may enable a user to obtain services from multiple organizations in a seamless, automated, and efficient manner.

FIG. 1 is an example overview of an implementation described herein. As shown, a user may call an interactive voice response (IVR) system to obtain a prescription for medication (at 1.1). The IVR system may inform the user that a mobile application for obtaining the prescription may be automatically downloaded and installed, which may provide a faster solution than obtaining the prescription then navigating through the IVR system (at 1.2). The user device may inform the IVR system that the user would like to download and install the mobile application, and the IVR system may respond by informing an instant access server about the request from the user device (at 1.3).

The instant access server may begin communicating with the user device in order to coordinate web services for the user device. For instance, in response to the request from the use device for the mobile application to obtain a prescription, the instant access server may cause the user device to download and install a mobile application for requesting a prescription, and the user device may proceed with obtaining a prescription through the installed mobile application (at 1.5). In some implementations, the instant access server may identify an appropriate mobile application based on activity involving the user device (e.g., the type of interaction between the user and the user device, the IVR system and the user device, etc.). For instance, if the user device has contacted the IVR system to request a prescription, the instant access server may take note of the intent of the user device and identify an appropriate mobile application accordingly. Additionally, the instant access server may provide the user device with intrusions and/or other information (e.g., a uniform resource locator (URL) to cause the user device to automatically download and install the identified mobile application.

In some implementations, the instant access server may inform the user that another mobile application may enable the user to automatically have the prescription be submitted and filled by a particular pharmaceutical company. Additionally, the instant access server may provide a prompt to the user for automatically downloading and installing the mobile application, and pending the user's consent to do so, instant access server may cause the user device to download and install the application from a pharmacy server (at 1.6). In some implementations, information describing user device activity (e.g., interactions between the user and the user device, activity corresponding to an operating system of the user device, activity corresponding to a mobile application installed on the user device, interactions between the user device and an application server, etc.) may be communicated from the user device to the instant access server via an application protocol interface (API) or in another suitable way. Receiving information regarding user device activity may enable instant access server to know what the user device is doing, identify what the user device should do next, provide the mobile application with subsequent instructions according to what the user device should do next (e.g., prompt the user for permissions or information, download a related mobile application), etc.

Once the mobile application from the pharmacy server has been installed, the mobile application may automatically submit the prescription to a pharmacy specified by the user so that the prescription may be rapidly filled. The instant access server may become aware (e.g., by monitoring user device activity as described above) that the prescription has been submitted and determine that the user may require a delivery service in order to have the medication transported from the pharmacy to the residence of the user. As such, the instant access server may again prompt the user to download and install another mobile application for scheduling delivery services for the prescription medication.

As mentioned above, the instant access server may know to prompt the user device to download and install another mobile application by, for example, monitoring user device activity (e.g., interactions between the user and the user device, activity corresponding to an operating system of the user device, activity corresponding to a mobile application installed on the user device, interactions between the user device and an application server, etc.) and identifying other services that might be helpful to the user (e.g., by identifying other mobile application or other services that the user may need to access). The user device activity may be monitored via one or more APIs or other types of interfaces between the user device and the instant access server. Additionally, the additional services identify by the instant access server may be the product of the instant access server querying one or more databases that relate mobile applications and other types of online services to activities that might be undertaken by a user.

In a similar way that the previous mobile applications were downloaded and installed, the instant access server may cause the user device to download and install the application for delivery services (at 1.7). Once installed, the user may use the mobile application to arrange for a delivery service to drop off the medication at a residence, a place of work, or another location specified by the user. In some implementations, the information and services that are available via a mobile device may also, or alternatively, be available via one or more webpages, and the instant access server may enable the user to automatically access the webpages instead of downloading and installing a mobile application. Additionally, authentications and/or registrations that are required in order to access the web services may be automatically resolved by the instant access server based on the MDN and/or profile information available to the instant access server. As such, techniques described herein may be used to provide a user with a seamless and automated solution to completing a task that requires products and/or services from distinct organizations.

Figure 2:
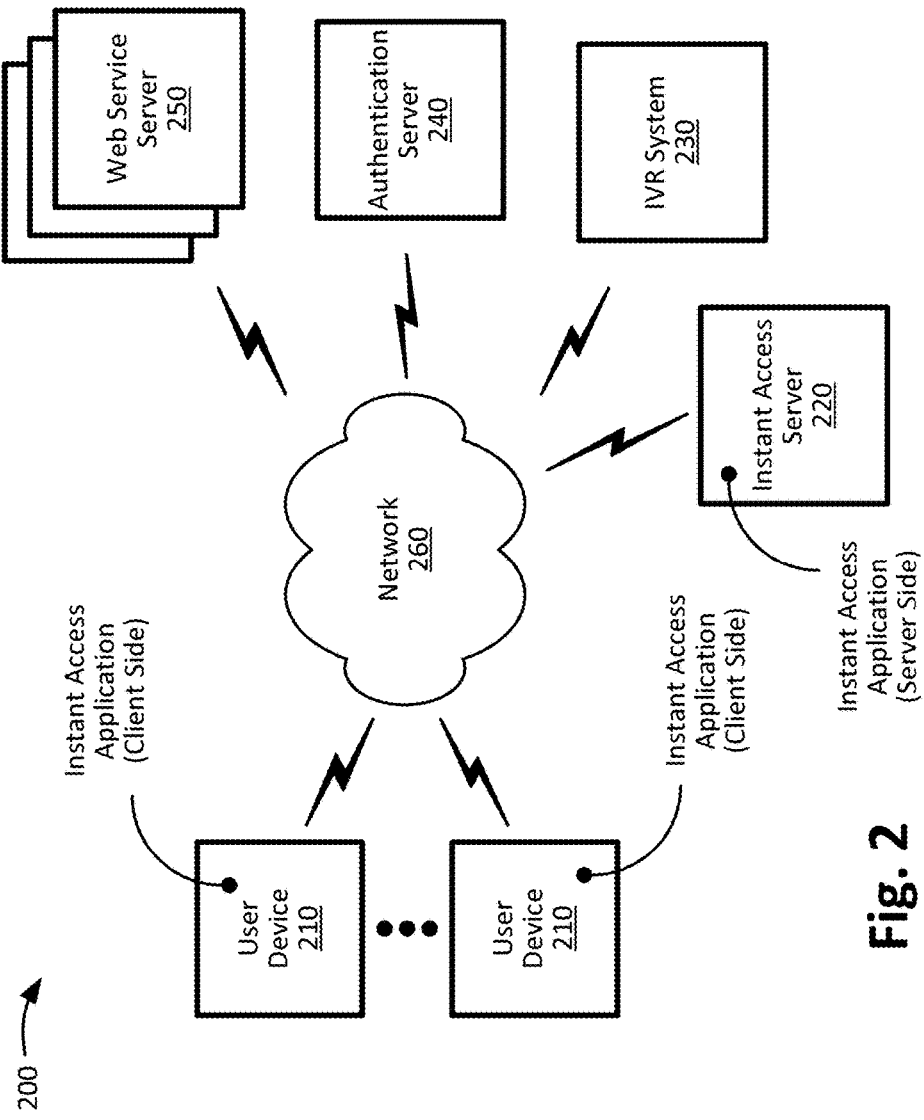
FIG. 2 illustrates an example environment in which systems and/or methods, described herein, may be implemented.

FIG. 2 illustrates an example environment in which systems and/or methods, described herein, may be implemented. As shown in FIG. 2, environment 200 may include user devices 210, instant access server 220, IVR system 230, authentication server 240, web service servers 250, and network 260.

User device 210 may include a portable computing and communication device, such as a personal digital assistant (PDA), a smart phone, a cellular phone, a laptop computer with connectivity to a cellular wireless network, a tablet computer, etc. User device 210 may also include non-portable computing devices, such as a desktop computer, a consumer or business appliance, or other devices that have the ability to connect to network 240. User device 210 may also include a computing and communication device that may be worn by a user (also referred to as wearable devices) such as a watch, a fitness band, a neckless, glasses, an eyeglass, a ring, a belt, a headset, or another type of wearable device. User device 210 may include software (such as an instant access application) that enables user device 210 to perform one or more of the operations described herein, such as receiving information and instructions from instant access server 220, downloading and installing mobile applications from web service servers 250, automatically accessing webpages hosted by web service servers 250, etc.

Instant access server 220 may include one or more computing devices, such as a single server device or a collection of server devices. Instant access server 220 may be connected to, or incorporated within, IVR system 230 (which may include one or more server devices capable of communicating with user device 210 via a telephone call). As such, while instant access server 220 and IVR system 230 are presented in FIG. 2 as distinct devices, depictions and/or descriptions of instant access server 220 and IVR system 230 presented herein may be refer to an implementation where instant access server 220 is incorporated within IVR system 230. In some implementations, instant access server 220 may include another type of network device other than, or in addition to, IVR system 220. For instance, in some implementations, instant access server 220 may include authentication system 240, web service server 250, and/or another type of network device. Instant access server 220 may communicate with user device 210 and/or web service servers 250 via one or more API to enable the functionalities described herein.

Instant access server 220 may include a server-side version of an instant access application that may enable instant access server 220 to cause user device 210 to automatically download and install a mobile application, authenticate user device 210 with respect to the mobile application by communicating with authentication server 240, and/or enable user device 210 to instantly access one or more web services via the mobile application (which may involve communicating with web service server 250). In some implementations, instant access server 220 may maintain a context for services being provided to user device 210. Maintaining a context for services being provided to user device 210 may enable instant access server 220 to identify subsequent services (which may include mobile applications or services available via a website) that may be required by, or helpful to, user device 210. Referring to the example provided above with reference to FIG. 1, if user device 210 is using a mobile application to request a prescription, instant access server 220 may determine that user device 210 may subsequently require, or benefit from, a mobile application for submitting the prescription to a pharmacy to have the prescription filled.

Authentication system 240 may include one or more computing devices, such as a server device or a collection of server devices. Authentication system 240 may be capable of communicating with instant access server 220 and/or web service server 250 to authenticate user device 210 for a particular web service. In some implementations, authentication system 240 may authenticate user device 210 based on a telephone number or another type of identifier corresponding to user device 210. For example, instant access server 220 may communicate a telephone number of user device 210 to authentication system 240, and authentication system 240 may query a database of user information (e.g., a name, a street address, a username, a password, etc.) associated with the telephone number in order to identify and authenticate the user with web service server 250. In some implementations, authentication server 240 may also assist instant access server 220 to register a user of user device 210 for a web service available from web service server 250.

Web service server 250 may include one or more computing devices, such as a server device or a collection of server devices. Web service server 250 may include a repository of mobile applications, from which user device 210 may download a mobile application. Web service server 250 may, in some implementations, be associated with an "app store," via which users can typically browse, purchase, and/or download applications. Additionally, or alternatively, web service server 250 may operate as an application server for one or more applications installed on user device 210. For instance, user device 210 may download and install a mobile application directed to mapping services from web service server 250, and web service server 250 may provide one or more types of mapping services to the mobile application installed on user device 220.

Network 260 may include one or more wired and/or wireless networks. For example, network 260 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 260 may include a local area network (LAN), a wireless LAN (WLAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

Figure 3:
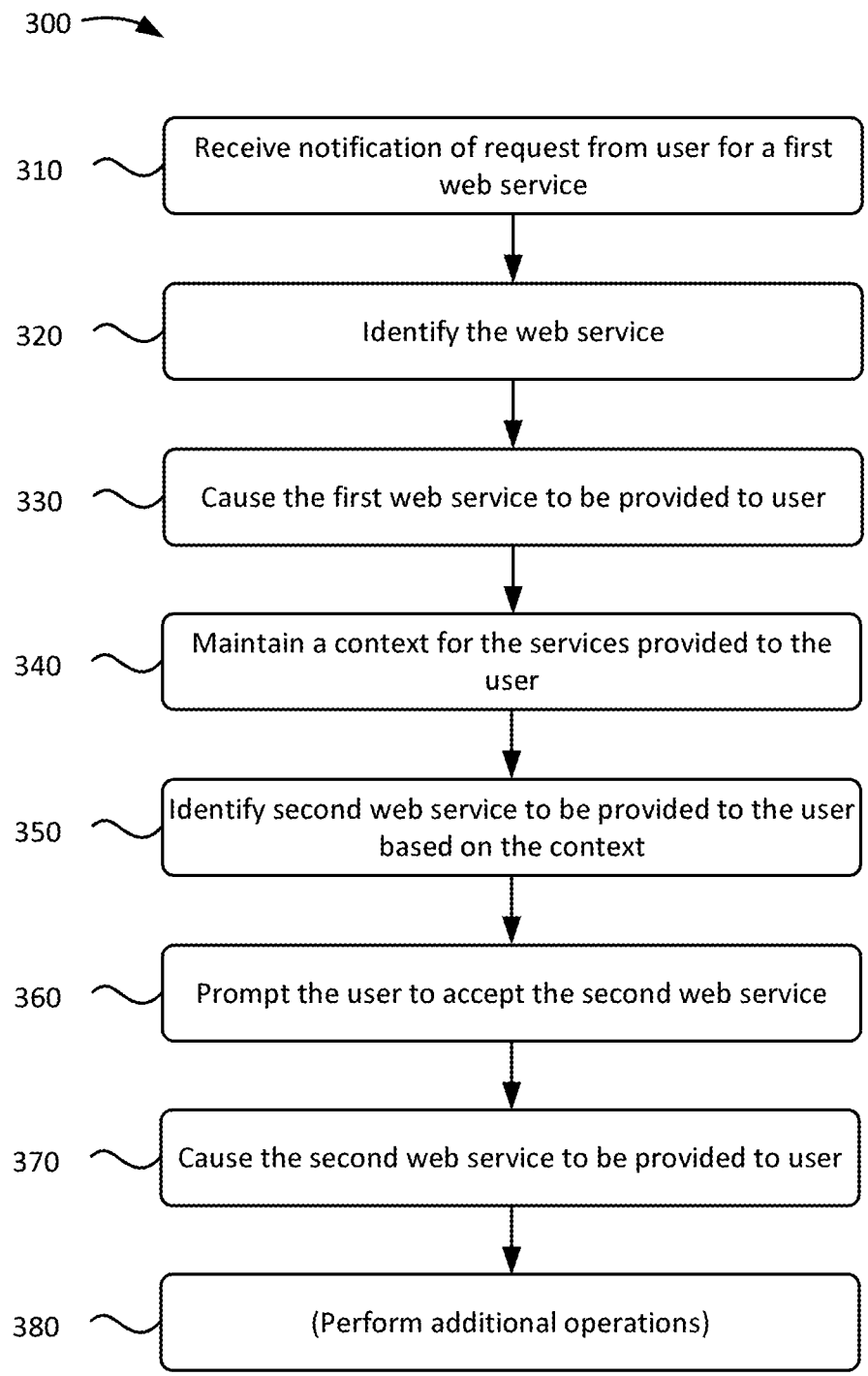
FIG. 3 is a flowchart of an example process for providing instant and cohesive accesses to diverse web services.

FIG. 3 is a flowchart of an example process 300 for providing instant and cohesive accesses to diverse web services. In some implementations, process 300 may be performed by instant access server 220 (e.g., by instant access application). In some implementations, some or all of the blocks of process 300 may be performed by one or more other devices.

As shown, process 300 may include receiving a notification of a request from a user for a first web service (block 310). For example, instant access server 220 may receive a notification originating from user device 210 that a user would like to obtain a particular web service. In some implementations, the notification may be communicated to instant access server 220 via IVR system 230. In some implementations, IVR system 230 may provide information of the call to instant access server 220. Examples of such information may include options provided to the user device during the call and key presses, voice responses, or other selections made by the user during the call. For instance, IVR system 230 may provide information identifying a type of service, a mobile application, a website, etc. that is being sought by user device 210. In some implementations, the notification may be communicated to instant access server 220 directly from user device 210.

Process 300 may include identifying the first web service (block 320). For example, instant access server 220 may identify a web service requested by user device 210 based on device activity information regarding user device 210. As mentioned above, examples of device activity information may include interactions between the user and user device 210, interactions between user device 210 and IVR system 230, etc.). For instance, instant access server 220 may receive information from IVR system 230 identifying user device 210, web service options provided to user device 210 during a call between user device 210 and IVR system 230, and the web service requested by user device 210. Additionally, instant access server 220 may use the device activity information to identify the web service (e.g., the mobile application, the website, etc.) requested. In some implementations, instant access server 220 may identify the web service by determining the server and/or URL where the web service may be located and/or accessed.

Process 300 may include causing the first web service to be provided to the user (block 330). For example, instant access server 220 may provide instructions to user device 210 to obtain the web service (e.g., download the mobile application, access a webpage, a URL, etc.) from web service server 250. In some implementations, instant access server 220 may do so using an API between instant access server 220 and user device 210. For instance, instant access server 220 may use an API between instant access server 220 and user device 210 to provide user device with the appropriate instructions and/or information for downloading and installing (or otherwise accessing) the web service. Additionally, the mobile application may be downloaded by user device 210 via a download accelerator program that may, for example, enable user device 210 to download the mobile application rapidly while user device 210 is still in communication with IVR system 230.

In some implementations, instant access server 220 may cause authentication information to be provided to web service server 250 so that the web service may be provided to user device 210. The authentication information may be provided to web service server 250 from any combination of user device 210, instant access server 220, and/or authentication server 240. For example, instant access server 220 may access authentication server 240 and/or another system that include a variety of information that may be used to authenticate a user to access a web service. Examples of such information may include MDN, user names, home addresses, work addresses, email addresses, passwords, security codes, security questions, answers to security questions, authentication information (e.g., usernames and passwords) associated with different web services), names of family members (e.g., a mother's maiden name), etc. In some implementations, instant access server 220 may communicate with web service server 250 to identify what types of authentication information is required and retrieve the information from authentication server 240 in order to authenticate the user for the web service. In some implementations, instant access server 220 may acquire the necessary authentication information based on the MDN of user device 210.

In some implementations, instant access server 220 may also, or alternatively, provide any login or registration information required by the web service by communicating with authentication server 240 and/or web service server 250. In some implementations, prior to causing user device 210 to download and install a mobile application, instant access server 220 may determine whether user device 210 has already installed the mobile application. In such implementations, instant access server 220 may cause user device 210 to open the mobile application to a particular page corresponding to the web service requested.

Process 300 may include maintaining a context for services provided to the user (block 340). For example, instant access server 220 may maintain a record of services that have been requested and/or that have been provided to user device 210. For instance, if the user has requested a mobile application for submitting a request for a medical prescription and the mobile application has been automatically downloaded and installed by user device 210, instant access server 220 may maintain a record of such. In some implementations, the context maintained by instant access server 220 may include other information, such as whether the user has been successfully authenticated for a particular service, interactions between the user and the service (e.g., whether the user has actually submitted a request for a medical prescription and whether the medical prescription has been provided), etc. In some implementations, such information may be communicated from user device 210 to instant access server 220 via an appropriate API between user device 210 and instant access server 220. In some implementations, an API between instant access server 220 and web service server 250 may be used to communicate such information and/or other types of information discussed herein, which my further expedite the process of providing users with instant access to diverse web services. As such, in some implementations, maintaining a context for web services provided to the user may enable instant access server 220 to have a clear description of what services the user has received.

Process 300 may include identifying a second web service to be provided to the user, based on the context (block 350). For instance, instant access server 220 may identify one or more web services that may be useful or required by a user based on the context associated with the user (e.g., services previously provided to the user). In some implementations, instant access server 220 may include a database or another type of repository that logically associates web services, and/or particular interactions with the web services, to other types of web services. In some implementations, instant access server 220 may query the repository for web services that may be useful or required by the user based on information included in the context associated with the user. For instance, if a web service accessed by a user is a service for requesting a medial prescription, then related web services may include a service to have the prescription filled by a nearby drug store and a service to have the corresponding medication dropped off at the home or another location specified by the user.

Process 300 may include prompting the user to accept the second web service (block 360). For example, instant access server 220 may communicate instructions to user device 210 to prompt the user about accepting a web service that would be useful or necessary to the user. In some implementations, instant access server 220 may prompt the user regarding the second web service within the mobile application corresponding to the first web service (e.g., via an appropriate API), via a webpage generated by instant access server 220 (e.g., using HyperText Markup Language 5 (HTML5)), via an SMS message, via an email, via a pop-up notification, and/or using some other notification technique.

In some implementations, instant access server 220 may cause the user to be prompted to accept a web service associated with a web service previously provided to the user. For example, if the user has recently used a web application to submit a request for a medical prescription, instant access server 220 may prompt the user to accept a mobile application from a list of mobile applications that would be suitable for submitting the medical prescription to a pharmacy to be filled (e.g., a list of mobile applications corresponding to different drug stores). In some implementations, instant access server 220 may cause the user to be prompted with a menu of web services from which the user may accept one or more web services. For instance, if the user has recently used a web application to submit a request for a medical prescription, instant access server 220 may prompt the user to accept a mobile application for submitting the medical prescription to a pharmacy and another mobile application for requesting that the prescription be delivered to a residence of the user.

Process 300 may also include causing the second web service to be provided to the user (block 370). For example, instant access server 220 may provide instructions to user device 210 to obtain the second web service (e.g., download the mobile application, access a webpage, etc.) from web service server 250. The web service server 250 for the second web service may correspond to an organization that is distinct from the web service server 250 of the first web service. The web service may available via a mobile application or a website. In some implementations, instant access server 220 may cause authentication information to be provided to web service server 250 so that the second web service may be automatically provided to user device 210. For instance, instant access server 220 may cause user information (which may be stored by user device 210, instant access server 220, and/or authentication server 240) to be provided to web service server 250 in order to register and/or authenticate the user for the second web service.

Process 300 may include performing additional operations (block 380). For instance, instant access server 220 may perform additional operations that are similar to those discussed above in order to seamlessly provide to user device 210 a sequence of web services that are related to a particular objective. For instance, if the first web service and the second web service related to obtaining a medical prescription and having the medical prescription filled by a pharmacy, then a third web service may include enabling the user to arrange for the corresponding medication to be delivered to his or her home.

FIGS. 4-13 are examples of user interfaces, which may be presented by user device 210, according to implementations described herein. Referring to FIG. 4, user device 210 may engage in a telephone call with IVR system 230. IVR system 230 may provide user device 210 with a menu of options, such as an option (e.g., press "1") to speak to a staff member, an option (e.g., press "2") to submit a request for a prescription via a mobile application, etc. For the purposes of this example, assume that the user selects the option for submitting a request for a medical prescription via the mobile application.

As shown in the example of FIG. 5, instant access server 220 may cause user device 210 to automatically download and install a mobile application for submitting a request for a medical prescription, based on information provided by IVR system 230 to instant access server 220 about the web service requested by the user during a call. Once the mobile application is installed, instant access server 220 may cause the user device 210 to access a particular page within the mobile application that corresponds to submitting the request for the medical prescription. For example, as shown in FIG. 6, user device 210 may open the mobile application to a page that enables the user to enter information for submitting a request for the medical prescription. As mentioned above, instant access server 220 may provide any identification and/or authentication information necessary for downloading, installing, and/or accessing the mobile device by communicating with authentication server 240 and web service server 250.

Instant access server 220 may monitor the progress (or context) of user device 210 with respect to the task undertaken by user device 210. For instance, instant access server 220 may monitor user device 210 as the user submits a request for the medical prescription. In response, instant access server 220 may cause user device 210 to prompt the user to accept another web service that is related to the web service previously provided. For instance, in the example provided in FIG. 7, instant access server 220 may cause user device 210 to prompt the user to access a web service corresponding to a pharmacy that can full the prescription requested by the user. As shown, in case the user is not satisfied by the options provided, instant access server 220 may also provide an option for searching for other applications or web services.

Figures 8, 9:
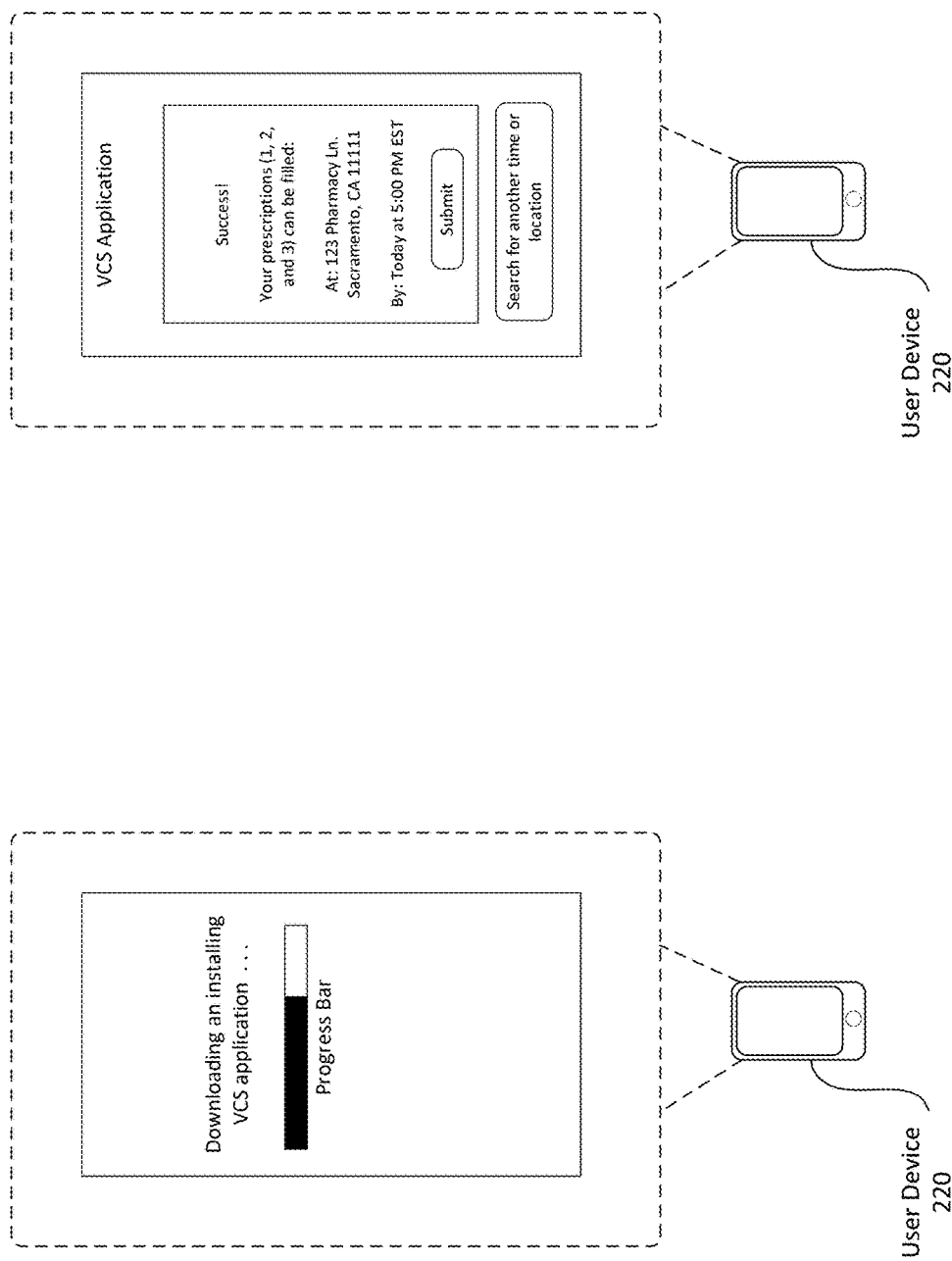

For the purposes of this example, assume that the user selects the option for having the prescription filled by VCS. Accordingly, as shown in the example of FIG. 8, instant access server 220 may cause user device 210 to automatically download and install a mobile application for having the prescription filled by VCS. In some implementations, prior to causing user device 210 to download and install a mobile application, instant access server 220 may verify that user device 210 does not already have the mobile application installed. Once the mobile application is installed, instant access server 220 may cause user device 210 to access a particular page within the mobile application that corresponds to having the prescription.

As mentioned above, instant access server 220 may maintain context information for user device 210, which may include the overall progress that user device 210 is making with respect to a sequence of operations involved in completing a task (e.g., obtaining a prescription, having the prescription filled, and having the prescription delivered). In some implementations, the context corresponding to user device 210 may also include substantive information regarding the task. For instance, the context may not only include whether a request for a prescription has been made and whether a prescription has been issued, but the context may also include the actual prescription itself, which may be used by instant access server 220 in assisting the user in completing the task at hand. For instance, as shown in FIG. 9, instant access server 220 may automatically interact with the mobile application to determine whether a pharmacy (e.g., VCS) is able to fill the user's prescription and determine the time and location where the prescription can be filled. Additionally, the mobile application may be used to provide the information to the user and to verify whether the user consents to having the prescription filled accordingly.

Instant access server 220 may continue to monitor the progress (or context) of user device 210 with respect to the task undertaken by user device 210. For instance, instant access server 220 may monitor user device 210 as the user submits a request for the prescription to be filled by VCS at a given time and location. In response, instant access server 220 may cause user device 210 to prompt the user to accept another web service that is related to the web service previously provided. For instance, in the example provided in FIG. 10, instant access server 220 may cause user device 210 to prompt the user to access a web service corresponding to a delivery service that can deliver the medication to the home of the user. As shown, in case the user is not satisfied by the options provided, instant access server 220 may also provide an option for searching for other applications or web services capable of delivering the medication.

For the purposes of this example, assume that the user selects the option for having the medication delivered by one of the organizations suggested by instant access server 220. Accordingly, as shown in the example of FIG. 11, instant access server 220 may cause user device 210 to automatically download and install a mobile application for having the medication delivered by Delivery Service A. In some implementations, prior to causing user device 210 to download and install a mobile application, instant access server 220 may verify that user device 210 does not already have the mobile application installed. Once the mobile application is installed, instant access server 220 may cause user device 210 to access a particular page within the mobile application that corresponds to having the medication delivered.

Figures 12, 13:
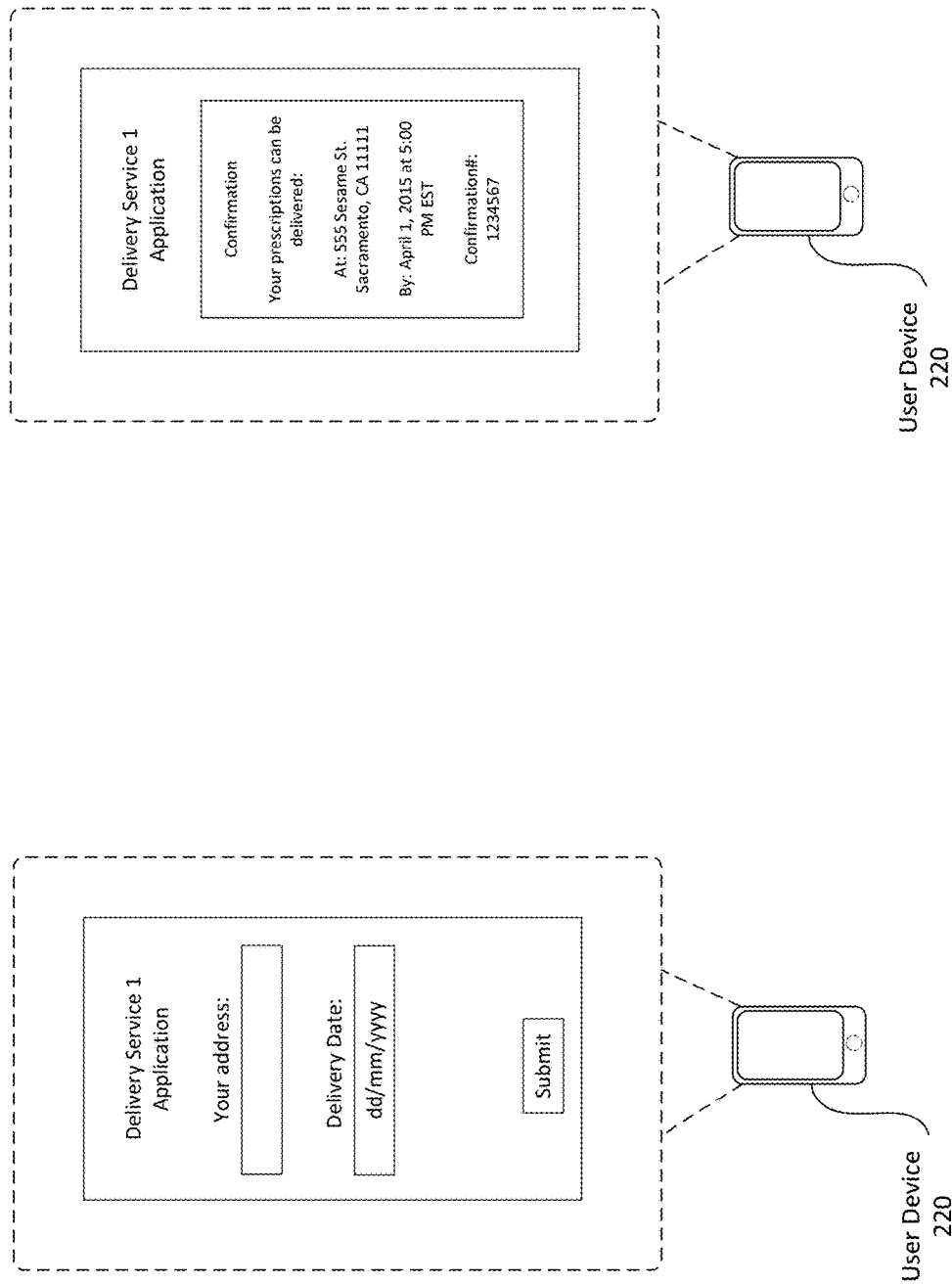

For instance, as shown in the example of FIG. 12, user device 210 may open the mobile application for Delivery Service 1 to a page where the user may enter his or her street address and/or a desired delivery date. In some implementations, the mobile application may include options for specifying additional information. For instance, the mobile application may include interface features (e.g., textboxes, drop down menus, radio buttons, etc.) for specifying whether the address is a home address, a work address, or another type of address, for specifying a preferred drop off time or time of day (e.g., morning, afternoon, or evening), for specifying a telephone number that the delivery service should call in case of delays, problems, or questions, for specifying the medication to be delivered or the name of the person to whom the medication should be delivered, etc. In some implementations, an API between user device 210, instant access server 220, and/or web service server 250 may automatically identify the information required by the application and automatically fill in any information already known to user device 210, instant access server 220, and/or we services server 250. Examples of such information may include a name of the user, an MDN of user device 210, a home address of the user, etc. The user may select the Submit button in order to submit an order for delivery As shown in the example of FIG. 13, once the user submits the information required for delivering the medication, the mobile application for Delivery Service 1 may provide a confirmation page that specifies the address, date, and time that the medication will be delivered. A confirmation number may also be provided in case the user needs to contact the delivery service regarding his or her request for delivery services. Depending on the implementations, may different types and arrangements of information may be provided to the user, and FIG. 13 is provided as only one such example.

Figure 14:
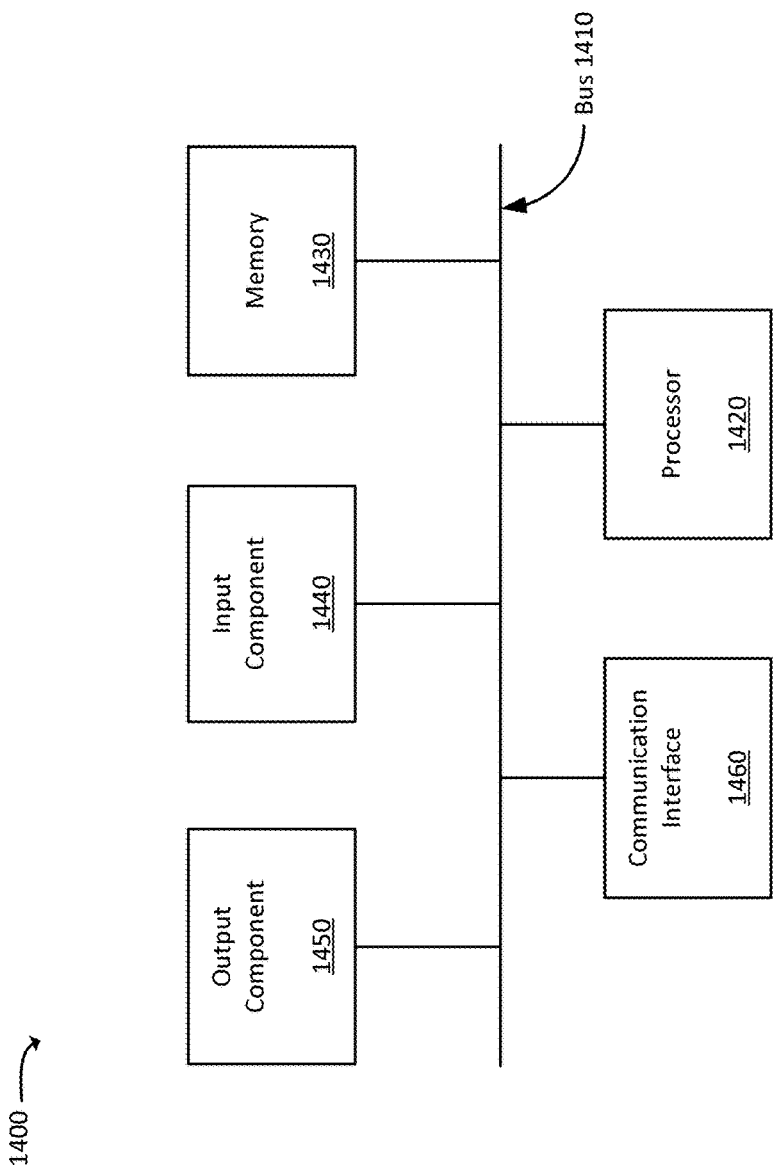
FIG. 14 illustrates example components of one or more devices, according to one or more implementations described herein.

FIG. 14 is a diagram of example components of a device 1400. Each of the devices illustrated in FIGS. 1, 2, and 4-13 may include one or more devices 1400. Device 1400 may include bus 1410, processor 1420, memory 1430, input component 1440, output component 1450, and communication interface 1460. In another implementation, device 1400 may include additional, fewer, different, or differently arranged components.

Bus 1410 may include one or more communication paths that permit communication among the components of device 1400. Processor 1420 may include a processor, microprocessor, or processing logic that may interpret and execute instructions. Memory 1430 may include any type of dynamic storage device that may store information and instructions for execution by processor 1420, and/or any type of non-volatile storage device that may store information for use by processor 1420.

Input component 1440 may include a mechanism that permits an operator to input information to device 1400, such as a keyboard, a keypad, a button, a switch, etc. Output component 1450 may include a mechanism that outputs information to the operator, such as a display, a speaker, one or more light emitting diodes (LEDs), etc.

Communication interface 1460 may include any transceiver-like mechanism that enables device 1400 to communicate with other devices and/or systems. For example, communication interface 1460 may include an Ethernet interface, an optical interface, a coaxial interface, or the like. Communication interface 1460 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 1400 may include more than one communication interface 1460. For instance, device 1400 may include an optical interface and an Ethernet interface.

Device 1400 may perform certain operations described above. Device 1400 may perform these operations in response to processor 1420 executing software instructions stored in a computer-readable medium, such as memory 1430. A computer-readable medium may be defined as a non-transitory memory device. A memory device may include space within a single physical memory device or spread across multiple physical memory devices. The software instructions may be read into memory 1430 from another computer-readable medium or from another device. The software instructions stored in memory 1430 may cause processor 1420 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks has been described with regard to FIG. 3, the order of the blocks may be modified in other implementations. Further, non-dependent blocks may be performed in parallel. Similarly, while series of communications have been described with regard to several of the figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, performed by a server device, the method comprising:
   receiving, by the server device and from an interactive voice response (IVR) system, a notification that a user device, engaged in a telephone call with the IVR system, has requested a first web service;

causing, by the server device and based on the request, the user device to automatically access the first web service via a first application;
maintaining, by the server device and after the user device is caused to automatically access the first web service via the first application, a record of user interactions with the first web service via the first application;
identifying, by the server device and based on the user interactions with the first web service via the first application, that a particular user interaction with the first web service includes a type of interaction that is associated with a second web service that is a different web service from the first web service; and
causing, by the server device and based on the particular user interaction with the first web service via the first application, the user device to automatically access the identified second web service via a second application that is different from the first application.

2. The method of claim 1,
wherein causing the user device to automatically access the first web service includes causing the user device to download and install the first application, and
wherein causing the user device to automatically access the second web service includes causing the user device to download and install the second application.

3. The method of claim 1, further comprising:
identifying a third web service, that is associated with the second web service, to be provided to the user device, wherein the third web service is different from the first and second web services; and
causing the user device to automatically access the third web service.

4. The method of claim 3, wherein the third web service includes at least one of:
a mobile application, or
a webpage.

5. The method of claim 1, further comprising:
causing the user device to prompt a user of the user device to accept the second web service prior to causing the user device to automatically access the second web service.

6. The method of claim 1, wherein the second web service is identified further based on a logical association between the first web service and the second web service.

7. The method of claim 1, further comprising:
identifying a plurality of mobile applications capable of providing the second web service to the user device;
providing a list of the plurality of mobile applications to the user device; and
receiving a selection, via the user device, regarding a single mobile application, from the plurality of mobile applications, to provide the second web service, the single mobile application being the second application,
wherein causing the user device to automatically access the second web service includes causing the user device to download, install, and launch the second application corresponding to the second web service.

8. The method of claim 1, further comprising:
providing information, obtained via the first web service, to the second web service to enable the user device to automatically access the second web service.

9. A server device, comprising:
a non-transitory memory device storing a plurality of processor-executable instructions; and
a processor configured to execute the processor-executable instructions, wherein executing the processor-executable instructions causes the processor to:

receive, from an interactive voice response (IVR) system, a notification that a user device, engaged in a telephone call with the IVR system, has requested a first web service;
cause, based on the request, the user device to automatically access the first web service via a first application;
maintain, after the user device is caused to automatically access the first web service via the first application, a record of user interactions with the first web service via the first application;
identify, based on the user interactions with the first web service via the first application, that a particular user interaction with the first web service includes a type of interaction that is associated with a second web service that is a different web service from the first web service; and
cause, based on the particular user interaction with the first web service via the first application, the user device to automatically access the identified second web service via a second application that is different from the first application.

10. The server device of claim 9,
wherein to cause the user device to automatically access the first web service, the processor-executable instructions further cause the processor to cause the user device to download and install the first application, and
wherein to cause the user device to automatically access the second web service, the processor-executable instructions further cause the processor to cause the user device to download and install the second application.

11. The server device of claim 9, wherein the processor-executable instructions further cause the processor to:
identify a third web service, that is associated with the second web service, to be provided to the user device, wherein the third web service is different from the first and second web services; and
cause the user device to automatically access the third web service.

12. The server device of claim 11, wherein the third web service includes at least one of:
a mobile application, or
a webpage.

13. The server device of claim 9, wherein the processor-executable instructions further cause the processor to:
cause the user device to prompt a user of the user device to accept the second web service prior to causing the user device to automatically access the second web service.

14. The server device of claim 9, wherein the second web service is identified further based on a logical association between the first web service and the second web service.

15. The server device of claim 9, wherein the processor-executable instructions further cause the processor to:
identify a plurality of mobile applications capable of providing the second web service to the user device;
provide a list of the plurality of mobile applications to the user device; and
receive a selection, via the user device, regarding a single mobile application, from the plurality of mobile applications, to provide the second web service, the single mobile application being the second application,
wherein to cause the user device to automatically access the second web service, the server device causes the user device to download, install, and launch the second application corresponding to the second web service.

16. The server device of claim 9, wherein the processor-executable instructions further cause the processor to:
provide information, obtained via the first web service, to the second web service to enable the user device to automatically access the second web service.

17. A server device, comprising:
a non-transitory memory device storing a plurality of processor-executable instructions; and
a processor configured to execute the processor-executable instructions, wherein executing the processor-executable instructions causes the processor to:
receive a notification that a user device has requested a first web service available via a first mobile application;
cause, based on the request, the user device to automatically access the first web service by downloading and installing the first mobile application;
monitor inputs and outputs, of the user device regarding the first web service;
identify, based on the monitored inputs and outputs, that a particular input or output, of the monitored inputs and outputs, is associated with a second web service that is different from the first web service;
cause, based on the particular input or output, the user device to automatically access the second web service by downloading and installing a second mobile application that is different from the first mobile application.

18. The server device of claim 17, wherein the processor-executable instructions further cause the processor to:
cause the user device to prompt a user of the user device to accept the second web service prior to causing the user device to automatically access the second web service.

19. The server device of claim 17, wherein the second web service is identified further based on a logical association between the first web service and the second web service.

20. The server device of claim 17, the processor-executable instructions cause the processor to:
identify, based on the updated context, a plurality of mobile applications capable of providing the second web service to the user device;
provide a list of the plurality of mobile applications to the user device; and
receive a selection, from the user device, regarding a particular mobile application, from the plurality of mobile applications, to provide the second web service, the particular mobile application being the second mobile application; and
cause the user device to automatically access the second web service by downloading, installing, and launching the selected second mobile application.

* * * * *